Jan. 25, 1938.　　　K. PRITSCHOW ET AL　　　2,106,622
PHOTOGRAPHIC CAMERA
Filed Feb. 18, 1936　　　3 Sheets-Sheet 3
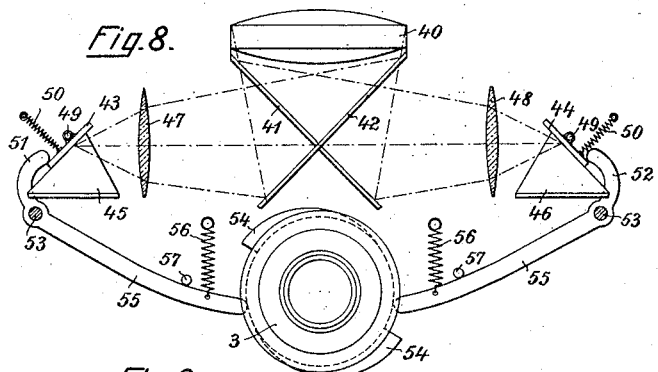
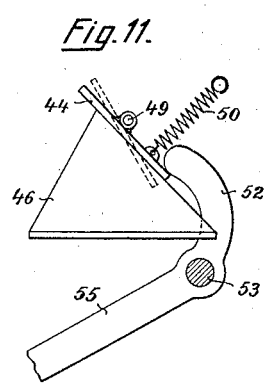
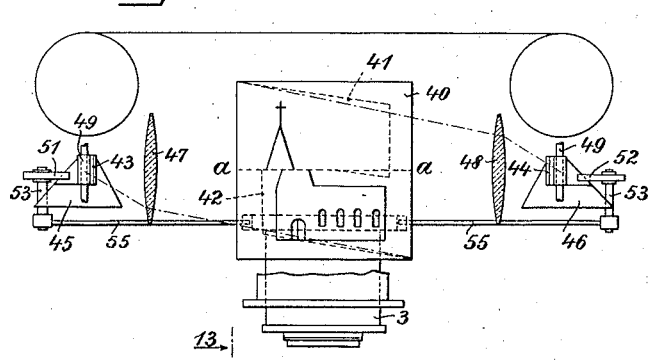
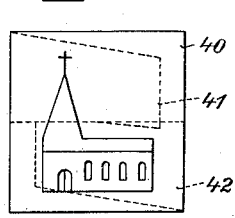
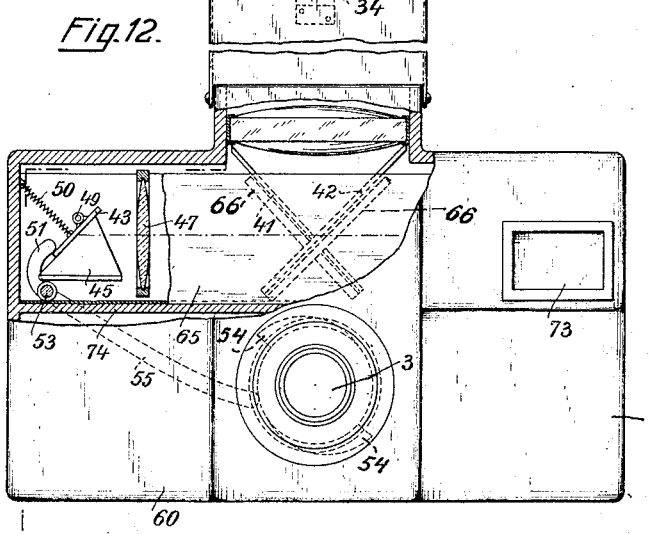
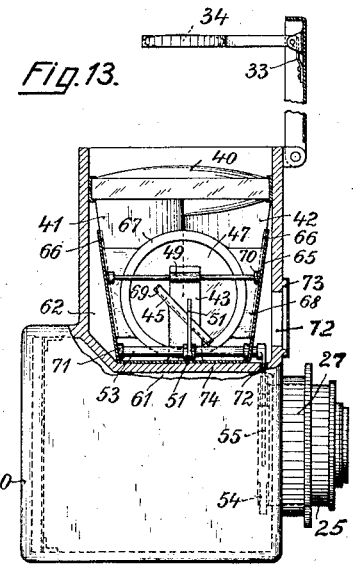
Inventor:
Karl Pritschow,
Hans Dephoide
by Franz Reichold
Attorney.

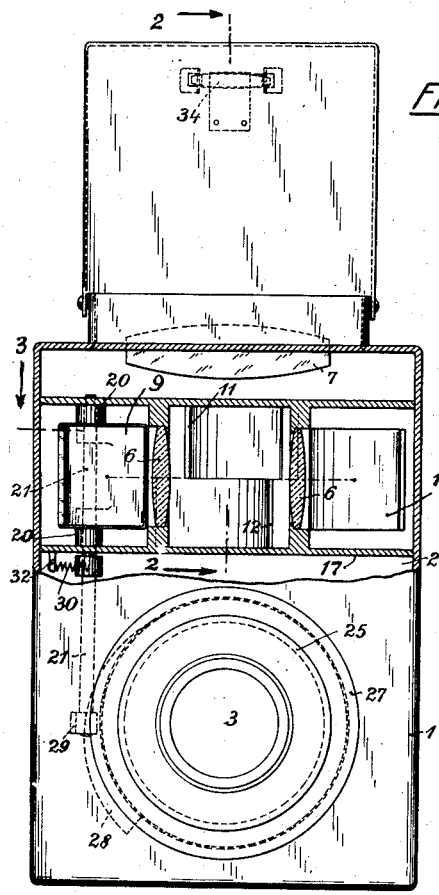

Patented Jan. 25, 1938

2,106,622

UNITED STATES PATENT OFFICE 2,106,622

PHOTOGRAPHIC CAMERA

Karl Pritschow and Hans Dopheide, Brunswick, Germany, assignors to Voigtländer & Sohn Aktiengesellschaft, Brunswick, Germany, a joint-stock company of Germany Application February 18, 1936, Serial No. 64,521
In Germany January 19, 1934

7 Claims. (Cl. 95—44)

Our invention relates to improvements in photographic cameras, and more particularly in the construction of the finder. One of the objects of the improvements is to provide a finder which may be used as a view finder and a range finder, and with this object in view our invention consists in constructing the finder of mirrors and lenses arranged to act as a range finder and to produce an image of the subject to be photographed which is circumscribed so as to correspond to the image produced by the camera lens on the sensitized surface.

Preferably the range finder is operatively connected with the focusing means of the camera lens, so that by means of the finder simultaneously the distance of the subject may be ascertained and the camera lens brought to focus and the portion of the subject to be photographed may be ascertained by the finder.

By means of our improved view and range finder the camera lens may be adjusted to effect focusing, and therefore our invention is particularly useful in connection with a bright finder. But we wish it to be understood that our invention is not limited to such use, and that it may also be used in connection with a finder having a focusing screen.

In the preferred embodiment of the invention the finder comprises a system of mirrors by means of which two pencils of rays emanating from complementary parts of the subject to be photographed are made to pass into the finder at spaced points and in the direction of the line of sight, and thereafter reflected into a direction transverse to the line of sight and again reflected upwardly and on an inclined mirror, where the pencils are combined on different sections of the mirror, so that an image of the subject is viewed through the finder by the photographer looking downwardly, the said system of mirrors being provided with adjusting means so that with the subject located different distances away from the camera the pencils may be correctly combined into a single pencil and a correct image is viewed through the finder. By connecting the adjusting means with the focusing means of the camera lens the said camera lens may be adjusted to effect focusing while the combined view and range finder is inspected.

Figure 6:
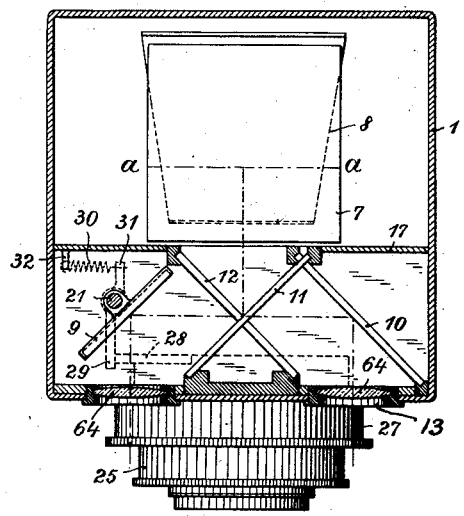
Figure 7:
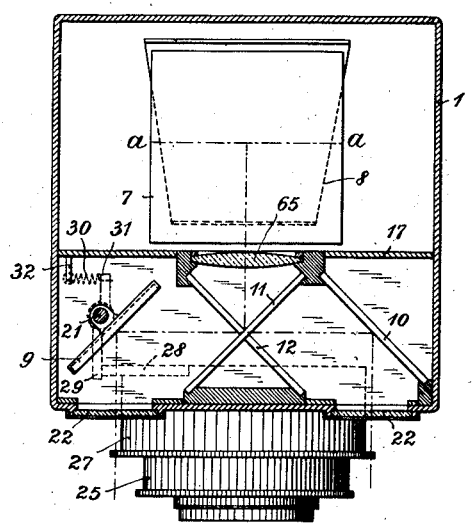

For the purpose of explaining the invention several examples embodying the same have been shown in the accompanying drawings in which the same reference characters have been used in all the views to indicate corresponding parts. In said drawings, Fig. 1 is a front elevation partly in section showing the camera, Fig. 2 is a side elevation partly in section taken on the line 2—2 of Fig. 1, Fig. 3 is a sectional plan view taken on the line 3—3 of Fig. 1, Figs. 4 and 5 are diagrammatical views showing the image as it appears in the finder, Fig. 4 showing the sections of the image correctly combined, and Fig. 5 showing the said sections shifted relatively to each other, Figs. 6 and 7 are sectional plan views similar to that shown in Fig. 3 and showing modifications, Fig. 8 is a diagrammatical elevation showing the optical system of a modified construction of the finder, Fig. 9 is a diagrammatical plan view of Fig. 8, Fig. 10 is a diagrammatical view showing the image viewed through the finder illustrated in Figs. 8 and 9, Fig. 11 is an elevation on an enlarged scale and partly in section showing two of the mirrors of the system shown in Fig. 8, Fig. 12 is a front elevation partly in section of the camera having the system shown in Fig. 8, and Fig. 13 is a sectional elevation taken on the line 13—13 of Fig. 12.

In the construction shown in Figs. 1 to 3 the camera comprises a casing 1 having an exposure chamber 2, a camera lens 3 and a finder chamber 4 located above the exposure chamber and separated therefrom by a partition 5. Within the finder chamber a bright finder is located which comprises two object lenses 6, a field lens 7, a main mirror 8 located below the field lens and inclined downwardly and forwardly at an angle of 45°, subsidiary mirrors 9 and 10 located at the sides of the camera casing and inclined forwardly and laterally substantially at angles of 45°, and a pair of sectional mirrors 11 and 12 located one above the other and in front of the mirror 8 and inclined forwardly and laterally in opposite directions at angles of 45° so as to cross each other. In front of the subsidiary mirrors 9 and 10 windows 13 are made in the front wall of the camera casing which preferably are closed by plates 22 of glass. The mirrors 11 and 12 have their reflecting surfaces 11' and 12' directed laterally and to opposite sides, and their size is such that each mirror reflects one half of the field of view. In the example shown in the figures the lenses 6 are located with their optical axes transversely of the optical axis of the camera lens 3 and between the mirrors 11, 12 and 9, 10 respectively. The field lens is preferably rectangular or square in shape.

The mounting 15 of the field lens 7 is fixed to the top wall 16 of the camera casing, and the mirror 8 is fixed to an inclined portion 14 of the partition 5. The mirrors 10, 11, and 12 and the lenses 6, 6 are mounted in a tubular frame 17 soldered or otherwise fixed to the front wall of the casing 1, the said frame being formed at its front side with openings 18 and at its rear side with an opening 19 to permit the light rays to pass through the windows 13 to the mirrors 9, 10 and from the mirrors 11 and 12 to the mirror 8. At one end the said frame carries lugs 20 providing bearings for a spindle 21 on which the mirror 9 is mounted. Thus the mirror 9 is adapted to be turned within the lugs 20 about a vertical axis.

The tube 25 of the camera lens 3 is formed with external screw-threads, and it is mounted in an internally screw-threaded sleeve 27 fixed to the front wall of the camera casing. Thus the position of the camera lens may be adjusted for focusing by turning the tube 25 as is known in the art. The tube 25 carries a cam 28, and the said cam is engaged by a crank arm 29 secured to the bottom end of the spindle 21 and held in engagement with the cam by means of a spring 30 fixed to a rearwardly extending arm 31 of the spindle 21 and a pin 32 fixed to the bottom of the frame 17. In the system the mirrors 9 and 10 provide the base line of the range finder. Preferably the focal length of the field lens is such that the rays reflected by the main mirror 8 are combined in the eye of the photographer when the eye is at a distance from the lens which is equal to the shortest distance of vision of the human eye.

The camera and its finder are used as follows: When the camera lens has been set for taking a photograph from a relatively remote subject both mirrors 9 and 10 are disposed at angles of 45° relatively to the optical axis of the camera lens, and both reflect light rays from the subject laterally through the lenses 6, 6 and on the mirrors 11 and 12, the mirror 11 being impinged upon by the upper section of the pencil of rays reflected by the mirror 9, and the mirror 12 being impinged upon by the lower section of the pencil of rays reflected by the mirror 10. The sectional pencils are reflected rearwardly by the mirrors 11 and 12 and they impinge respectively upon the rear and front parts of the forwardly and downwardly inclined mirror 8 which reflects the same upwardly through the field lens 7. Now the sectional pencils are viewed by the attendant through the said field lens, and they are combined into a single image exactly corresponding to the subject and the portion thereof which when an exposure is made appears on the sensitized surface. Fig. 4 shows the image. In the said image the sections are separated by a line which is produced by the intersecting edges of the mirrors 11 and 12, and which has been indicated in Figs. 3 and 4 by the letters a—a. In the preferred construction of the finder the image viewed through the finder and the image projected on the sensitized surface are substantially equal in size.

Preferably the lenses of the finder are constructed so that the image produced thereby has a size equal to or substantially equal to the size of the image projected on the sensitized surface.

It will be understood that the eye of the attendant inspecting the image produced by the finder must be located exactly in the optical axis of the lens 7, because otherwise the sectional images are displaced with relation to each other, and in order to avoid errors which might be produced by inaccurate position of the eye relatively to the finder we prefer to provide an ocular lens 34 which is mounted on a foldable frame 33 mounted on the top of the camera casing.

When a photograph is to be taken from a relatively near subject, and the camera lens and the mirror 9 are in the positions corresponding to relatively remote subjects the sections of the image viewed through the field lens are not in register, as is shown in Fig. 5, and therefore the angular position of the said mirror 9 is changed by the photographer by turning the tube 25 of the camera lens until the sections of the image are in register. The shape of the cam 28 is such that the sections are in register when the camera lens has been focused relatively to the subject.

It will therefore be understood that the attendant is enabled by means of the finder to ascertain the field of view of the camera lens and also to focus the camera lens.

The modification shown in Fig. 6 is similar to the one illustrated in Figs. 1 to 3, and the same letters of reference have been used in the said figure to indicate corresponding parts. As distinguished from the construction shown in Figs. 1 to 3 the object lenses of the finder are located in the windows 13 instead of being mounted between the mirrors 9 and 11 and 10 and 12 respectively. In Fig. 6 the said lenses have received the reference character 64. It will be understood that the glass plates 22 may be dispensed with, the finder casing being closed by the lenses 64.

In the modification shown in Fig. 7 the object lens 65 of the finder is located in the rear wall of the tubular frame 17 and between the mirrors 11, 12 and the mirror 8.

The finders shown in Figs. 6 and 7 are operated in the same way as the finder described with reference to Figs. 1 to 3, and the sectional images viewed through the finder are displaced relatively to each other transversely of the optical axis when the camera lens is out of focus.

In Figs. 8 to 13 we have shown a modification in which the system of crossing mirrors is combined with the main mirror of the view finder located below the field lens, the said mirror being made in two sections inclined downwardly and to opposite sides of the camera. As shown in Figs. 8 and 9, our improved view and range finder comprises a field lens 40, a pair of crossing sectional mirrors 41, 42 located below the field lens and inclined downwardly and to opposite sides of the camera and each covering one half of the area of the field lens 40, a pair of mirrors 43 and 44 located at the sides of the camera and each in position for reflecting rays on one of the sectional mirrors 41 and 42 and inclined downwardly and to opposite sides, a pair of mirrors 45 and 46 located respectively below the mirrors 43 and 44 and inclined downwardly and forwardly, and lenses 47 and 48 located respectively between the mirrors 43, 41 and 44, 42. In the construction shown in the figures both mirrors 43 and 44 are mounted on horizontal pivotal axes 49 by means of which they may be inclined more or less in accordance with the distance of the subject to be photographed. The said mirrors are acted upon by springs 50 tending to turn the same respectively clockwise and anti-clockwise, and further they are loosely engaged by arms 51, 52 fixed to shafts 53, the said arms being adapted to turn the mirrors 43 and 44 in opposition to the springs 50. The tube 25 of the camera lens 3 is adapted to be turned about its axis for focusing as has been described above, and the lens tube is provided with cams 54 engaging arms 55 fixed to the shafts 53. The arms are acted upon by springs 56 tending to hold the same in engagement with fixed stops 57. Above the field lens 40 there is an ocular lens 34 which is mounted on a foldable frame 33.

In Figs. 12 and 13 we have shown the manner of mounting the finder in a camera. The camera comprises a casing 60 having an exposure chamber 61 and a finder chamber 62. The exposure chamber is provided at its front side with an internally screw-threaded sleeve 27 in which the mounting 25 of the camera lens is mounted, the said mounting being provided at its inner end with the cams 54. Within the finder chamber a frame 65 is located on which most of the optical instruments are mounted. The inclined mirrors 41 and 42 are mounted on ribs 66, the lenses 3 are fixed in mountings 67 secured to the frame 65, the mirrors 45 and 46 are fixed to mountings 69 secured to the bottom of the frame 65, and the pivotal axes 49 are mounted in lugs 70 of the frame. The shafts 53 are mounted in lugs 71. The arms 55 extend downwardly through slots 72 made in a partition 74 separating the finder chamber from the exposure chamber.

In front of the mirrors 45 and 46 windows 72 are provided in the front wall of the camera casing, and the said windows are preferably closed by glass plates 73. The object lens 3 is located below the field lens 40 and the sectional mirrors 41 and 42.

The operation of the range finder is the same as has been described with reference to Figs. 1 to 3. When a photograph is to be taken from a comparatively remote subject, the mirrors 43 and 44 are inclined at angles of 45°, and an image is viewed through the ocular lens 34 and the field lens 40 which is composed of two sections meeting along the line a—a shown in Fig. 10. As appears from the said figure the said sectional images are combined into a correct image of the subject to be photographed, the portion of the image viewed through the finder corresponding to the portion of the image projected by the object lens on the sensitized film. The dimensions of the optical systems of the finder are such that the image viewed through the finder is substantially equal in size to the image projected on the sensitized film.

When a photograph is to be taken from a comparatively near subject, and the camera is directed on the said subject with the camera lens and the finder set as before the image of the said subject will not be sharp on the sensitized film and the sections of the image viewed through the finder are displaced with relation to each other, as is indicated in Fig. 9. Now the photographer turns the mounting 25 of the camera lens while looking through the finder, and such rotary movement of the lens is transmitted by means of the cams 54 and through the arms 55 and 51, 52 to the mirrors 43 and 44, and the photographer continues turning of the camera lens until the sectional images viewed through the finder are combined into a correct image. The relation between the finder system and the focusing means of the camera lens is such that the camera lens is in focusing position when a correct image appears in the finder.

We claim:

1. A photographic camera, comprising a casing having an exposure chamber and a camera lens, a finder chamber, a finder within said finder chamber adapted to produce an image of the subject to be photographed circumscribed so as to correspond to the image produced by the said camera lens on the sensitized surface and comprising an inclined mirror adapted to reflect the rays impinging thereon in the direction of the line of sight into a direction perpendicular thereto, two reflecting systems adapted to direct spaced pencils of rays emanating from complementary parts of the subject to be photographed one beside the other on said inclined mirror, said systems comprising a pair of mirrors disposed one at either side of said finder chamber and inclined forwardly and outwardly and in position for being impinged upon by said complementary pencils of rays emanating from the subject to be photographed and reflecting the same inwardly, a pair of mirrors in front of said first named inclined mirror disposed angularly of each other and of the line of sight and in position for reflecting the complementary pencils of rays reflected by said mirrors disposed at the sides of said finder chamber towards said first named mirror, means to adjust one of said reflecting systems in accordance with the distance of said subject to be photographed and so that the said complementary pencils of rays are combined on the said first named mirror into a correct image of the said complementary parts of the subject to be photographed, and means to adjust said camera lens for focusing.

2. A photographic camera as claimed in claim 1, in which the finder comprises an object lens located between the first named inclined mirror and the said pair of mirrors located in front thereof.

3. A photographic camera as claimed in claim 1, in which the finder comprises two object lenses located respectively between the said pair of mirrors in front of the first named inclined mirror and the said mirrors disposed at the sides of the finder chamber.

4. A photographic camera as claimed in claim 1, in which the finder comprises two object lenses located respectively in front of said mirrors disposed at the sides of the finder chamber.

5. A photographic camera, comprising a casing having an exposure chamber, a camera lens therein, a finder chamber and a finder comprising lenses constructed for producing an image corresponding and substantially equal in size to the image produced by said camera lens on the sensitized surface, said finder including two reflecting systems adapted to be impinged upon at spaced points by pencils of rays emanating from adjacent complementary parts of said subject and to combine the same into the said image, means to adjust one of the said systems in accordance with the distance of the subject to be photographed and so as to produce a correct image of the said complementary parts of the subject, and means to adjust said camera lens for focusing.

6. A photographic camera, comprising a casing having an exposure chamber and a finder chamber, a camera lens, a finder adapted to produce an image of the subject to be photographed circumscribed so as to correspond to the image produced by the said camera lens on the sensitized surface and comprising a pair of crossing mirrors inclined downwardly and laterally of the optical axis of said lens and two reflecting systems adapted to be impinged upon by two sectional pencils of rays emanating from adjacent complementary parts of the subject to be photographed and to throw the same on said crossing mirrors, means to adjust said finder in accordance with the distance of the subject so as to produce a correct combined image of the said parts of the subject, and means to adjust said camera lens for focusing.

7. A photographic camera, comprising a casing having an exposure chamber and a camera lens, a finder chamber, a finder within said finder chamber adapted to produce an image of the subject to be photographed circumscribed so as to correspond to the image produced by the said camera lens on the sensitized surface and comprising an inclined mirror adapted to reflect the rays impinging thereon in the direction of the line of sight into a direction perpendicular thereto, two reflecting systems adapted to direct spaced pencils of rays emanating from complementary parts of the subject to be photographed one beside the other on said inclined mirror, said systems comprising a pair of mirrors disposed one at either side of said finder chamber and inclined forwardly and outwardly and in position for being impinged upon by said complementary pencils of rays emanating from the subject to be photographed and reflecting the same inwardly, a pair of mirrors in front of said first named inclined mirror disposed angularly of each other and of the line of sight and in position for reflecting the complementary pencils of rays reflected by said mirrors disposed at the sides of said finder chamber towards said first named mirror, one of said reflecting systems being adjustable in accordance with the distance of said object to be photographed and so that the said complementary pencils of rays are combined on the said first named mirror into a correct image of the said complementary parts of the subject to be photographed, and common means for thus adjusting the said adjustable reflecting system and for adjusting said camera lens for focusing.

KARL PRITSCHOW.
HANS DOPHEIDE.